US009195962B2

(12) United States Patent
Topham et al.

(10) Patent No.: US 9,195,962 B2
(45) Date of Patent: Nov. 24, 2015

(54) GENERATING A SUBGRAPH OF KEY ENTITIES IN A NETWORK AND CATEGORIZING THE SUBGRAPH ENTITIES INTO DIFFERENT TYPES USING SOCIAL NETWORK ANALYSIS

(76) Inventors: Philip S. Topham, Huntington Beach, CA (US); Senthil Kumar Purushothaman, Garden Grove, CA (US); Ryan Peeler, Santa Ana, CA (US); Anthony M. Page, Santa Ana, CA (US); Daniel Vesely, Garden Grove, CA (US)

( * ) Notice: Subject to any disclaimer, the term of this patent is extended or adjusted under 35 U.S.C. 154(b) by 725 days.

(21) Appl. No.: 12/877,914

(22) Filed: Sep. 8, 2010

(65) Prior Publication Data

US 2011/0066714 A1   Mar. 17, 2011

Related U.S. Application Data

(60) Provisional application No. 61/241,801, filed on Sep. 11, 2009.

(51) Int. Cl.
   *G06F 15/173* (2006.01)
   *G06Q 10/10* (2012.01)
   *G06Q 30/02* (2012.01)

(52) U.S. Cl.
   CPC ............... *G06Q 10/10* (2013.01); *G06Q 30/02* (2013.01)

(58) Field of Classification Search
   CPC .................. G06Q 30/0255; H04L 29/08675; H04L 29/08936
   USPC .................................................. 709/223, 204
   See application file for complete search history.

(56) References Cited

U.S. PATENT DOCUMENTS

| 2006/0106847 A1* | 5/2006 | Eckardt et al. ................. 707/101 |
| 2006/0143081 A1* | 6/2006 | Argaiz ............................ 705/14 |
| 2007/0067271 A1* | 3/2007 | Lu ..................................... 707/3 |
| 2007/0226248 A1* | 9/2007 | Darr ................................ 707/102 |
| 2009/0132652 A1* | 5/2009 | Athale et al. ................... 709/204 |

OTHER PUBLICATIONS

Tang, Jie et al., "ArnetMiner: extraction and mining of academic social networks." In Proceedings of the 14th ACM SIGKDD international conference on Knowledge discovery and data mining, pp. 990-998. ACM, Aug. 2008.*

* cited by examiner

*Primary Examiner* — Joon H Hwang
*Assistant Examiner* — Sherman Lin
(74) *Attorney, Agent, or Firm* — Nguyen & Tarbet Patent Law Firm

(57) ABSTRACT

A method, system and computer-program product for generating a subgraph of key entities in a network and organizing entities in the subgraph are disclosed. The technique uses social network analysis centrality metrics to identify key entities in a network. The technique also uses social network analysis centrality metrics to categorize key entities into different types.

6 Claims, 9 Drawing Sheets

| Entity | Betweeness Centrality | Rank Score | Eigenvector Centrality | Rank Score |
|---|---|---|---|---|
| 301 | 16 | 9 | 0.077549 | 15 |
| 302 | 0 | 13 | 0.0291554 | 17 |
| 303 | 0 | 13 | 0.0279512 | 18 |
| 304 | 9.035714286 | 10 | 0.1922962 | 10 |
| 305 | 30 | 4 | 0.3744081 | 5 |
| 306 | 16.59393939 | 7 | 0.4277099 | 4 |
| 307 | 0 | 13 | 0.0583107 | 16 |
| 308 | 0 | 13 | 0.3604326 | 6 |
| 309 | 0 | 13 | 0.3604326 | 6 |
| 310 | 8.141666667 | 11 | 0.1866572 | 11 |
| 311 | 5.547727273 | 12 | 0.0901601 | 14 |
| 312 | 0 | 13 | 0.3604326 | 6 |
| 313 | 30.60075758 | 3 | 0.4526252 | 2 |
| 314 | 16.29891775 | 8 | 0.1269741 | 13 |
| 315 | 36.38614719 | 2 | 0.1617798 | 12 |
| 316 | 17.5 | 6 | 0.2163255 | 9 |
| 317 | 22.87142857 | 5 | 0.4384033 | 3 |
| 318 | 92.0237013 | 1 | 1 | 1 |

FIG. 4

| Entity | Betweeness Centrality | Rank Score | Eigenvector Centrality | Rank Score | Combined Reach |
|---|---|---|---|---|---|
| 113 | 30.60075758 | 3 | 0.4526252 | 2 | |
| 115 | 36.38614719 | 2 | 0.1617798 | 12 | 72% |
| 117 | 22.87142857 | 5 | 0.4384033 | 3 | |
| 118 | 92.0237013 | 1 | 1 | 1 | |

FIG. 5

| Entity | Betweeness Centrality | Rank Score | Eigenvector Centrality | Rank Score | Combined Reach |
|---|---|---|---|---|---|
| 105 | 30 | 4 | 0.3744081 | 5 | |
| 106 | 16.59393939 | 7 | 0.4277099 | 4 | |
| 113 | 30.60075758 | 3 | 0.4526252 | 2 | 83% |
| 115 | 36.38614719 | 2 | 0.1617798 | 12 | |
| 117 | 22.87142857 | 5 | 0.4384033 | 3 | |
| 118 | 92.0237013 | 1 | 1 | 1 | |

FIG. 6

| ENTITY |
| --- |
| 701 |
| 702 |
| 703 |
| 704 |
| 705 |
| 706 |
| 707 |
| 708 |
| 709 |
| 710 |
| 711 |
| 712 |
| 713 |
| 714 |
| 715 |
| 716 |
| 717 |
| 718 |
| 719 |
| 720 |
| 721 |
| 722 |
| 723 |

FIG. 7

| ENTITY | EIGENVECTOR | RANK | CLOSENESS | RANK |
|---|---|---|---|---|
| 701 | 0.57513354 | 4 | 0.270747695 | 1 |
| 702 | 0.727271332 | 2 | 0.247335837 | 6 |
| 703 | 0.698003891 | 3 | 0.253326403 | 4 |
| 704 | 1 | 1 | 0.249948718 | 5 |
| 705 | 0.24602397 | 5 | 0.256499316 | 3 |
| 706 | 0.002906696 | 12 | 0.2390153 | 11 |
| 707 | 0.094757987 | 6 | 0.244212847 | 9 |
| 708 | 0.058779607 | 7 | 0.24569009 | 8 |
| 709 | 0.032508334 | 9 | 0.259282902 | 2 |
| 710 | 0.030619741 | 10 | 0.245888407 | 7 |
| 711 | 0.036844006 | 8 | 0.241598097 | 10 |
| 712 | 0.006130765 | 11 | 0.234529882 | 12 |
| 713 | 0.00013637 | 17 | 0.221827781 | 14 |
| 714 | 0.001666251 | 13 | 0.214770424 | 15 |
| 715 | 0.001189442 | 14 | 0.228847779 | 13 |
| 716 | 0.000249992 | 15 | 0.207333674 | 16 |
| 717 | 2.08E-06 | 20 | 0.156760582 | 21 |
| 718 | 1.68E-06 | 21 | 0.167606602 | 19 |
| 719 | 0.000233419 | 16 | 0.192207587 | 18 |
| 720 | 7.08E-05 | 18 | 0.198049573 | 17 |
| 721 | 5.12E-08 | 23 | 0.145016364 | 22 |
| 722 | 7.99E-06 | 19 | 0.163403513 | 20 |
| 723 | 1.71E-07 | 22 | 0.141694285 | 23 |

FIG. 8

| Subgroup A | Subgroup B | Subgroup C | Subgroup D |
|---|---|---|---|
| 701 | Empty | 707 | 706 |
| 702 | | 708 | 712 |
| 703 | | 709 | 713 |
| 704 | | 710 | 714 |
| 705 | | 711 | 715 |
| | | | 716 |
| | | | 717 |
| | | | 718 |
| | | | 719 |
| | | | 720 |
| | | | 721 |
| | | | 722 |
| | | | 723 |

FIG. 9

| Subgroup A | Subgroup B | Subgroup C | Subgroup D |
|---|---|---|---|
| 701 | 702 | 709 | 706 |
| 703 | 707 | 710 | 712 |
| 704 | 708 | | 713 |
| 705 | 711 | | 714 |
| | | | 715 |
| | | | 716 |
| | | | 717 |
| | | | 718 |
| | | | 719 |
| | | | 720 |
| | | | 721 |
| | | | 722 |
| | | | 723 |

FIG. 10

GENERATING A SUBGRAPH OF KEY ENTITIES IN A NETWORK AND CATEGORIZING THE SUBGRAPH ENTITIES INTO DIFFERENT TYPES USING SOCIAL NETWORK ANALYSIS

CLAIM OF PRIORITY UNDER 35 U.S.C. §119

The present Application for Patent claims priority to Provisional Application No 61/241,801, entitled "A Systematic Method for Generating a Subgraph of Key Entities in a Network and Categorizing the Subgraph Entities Into Different Types Using Social Network Analysis" filed Sep. 11, 2009, and hereby expressly incorporated by reference.

TECHNICAL FIELD

The present disclosure is generally related to social networks, and more specifically, to systems and methods for identifying opinion leaders in a certain field, such as, for example, medicine or science.

BACKGROUND

Key entities are individuals or institutions whose opinions or actions are influential. They have the ability to influence the behavior of other entities in the same field or a related field. For example, key opinion leaders, in medicine, are generally medical practitioners or researchers relied upon by other practitioners or researchers to provide informative opinions on standard of care, pharmaceuticals, devices, and the importance of various biochemical pathways among other things. These opinions heavily influence the decisions and behaviors of other practitioners and researchers.

Key opinion leaders in medicine are often targeted by pharmaceutical and biotechnical companies. Key opinion leaders often provide these companies with marketing feedback and advocacy activity. In addition, key opinion leaders sometimes assist pharmaceutical companies in designing and engaging in clinical trials. Key opinion leaders also spread knowledge throughout the medical community on how and when to properly use a drug or device and provide feedback to the companies from the medical community on their products.

Identifying, establishing relationships with, and maintaining relationships with key opinion leaders is time consuming and expensive. It is therefore desirable to efficiently select key opinion leaders which meet the needs of a contacting company. For example, in the field of medicine, it may be more important to select someone who works on a specific subtype of lymphoma as that individual may have more influence over practitioners who deal with patients with that lymphoma subtype. Also, it may be important to choose a key opinion leader who has influence over practitioners practicing in certain geographic regions.

The most common current method used to for select key entities, such as key opinion leaders, is by using surveys. This technique has disadvantages. For instance, surveys tend to be very biased. Individuals who receive surveys tend to select their friends or close colleagues as key opinion leaders rather than making an objective selection. This is due to, at least in part, the fact that survey responders are limited to those individuals willing to fill in the survey in exchange for an honoraria, and over time subject matter experts within a domain respond to the surveys with the same answers producing the similar results.

Furthermore, the preparation, and interpretation of these surveys can be time consuming. Those who are surveyed generally expect to be monetarily compensated for their time. Moreover, considerable effort may be spent on identifying which persons to send the surveys to.

Thus, improved techniques for identifying key entities are needed.

A social network is a structure of nodes which generally represent organizations or individuals but can represent other entities: The nodes are connected to one another by links which represent relationships between entities represented by the nodes. A graphic representation of a social network is called a sociogram.

Social network analysis is a process of generating information from a social network. Using the techniques of social network analysis, information on social prestige and social position can be obtained for entities or groups of entities in a network. Information on the transport of influence and communication in a network can also be harvested. Visualization of sociograms, for instance, assists in determining barriers to the movement of information or paths by which information is likely to diffuse through.

Advanced matrix mathematical methods can be used to obtain numerical variables, called network centrality metrics, which quantitatively indicate characteristics of a node in a network. These characteristics provide insight into the social role of an entity in the network. There are several different types of network centrality metrics, including betweeness, Bonacich's power centrality, closeness, degree, and eigenvector centrality, as well as others. Each provides different information on the status, or importance of an entity in a network. Combinations of values for the different centrality measures, for a particular entity, may be used in combination to assess that entities importance, or role in the network. In addition, non-centrality metric data, for instance a researcher's publication count or an institution's geography may be combined with the centrality metric values to obtain an even clearer picture of the role of an entity in a particular social network.

Recent advances in computer technology, including improvements in the speed at which data may be acquired from remote sources, through the Internet, and the increased ability of a computer to manipulate large amounts of data within a short period of time have made the acquisition, construction, and analysis of large social networks, using network centrality metrics and other procedures, possible. In addition, new text matching software, designed for cleaning of large data sets, allows for the accurate analysis of large social networks from which a wealth of diverse, informative data can be constructed.

Methods for identifying key entities based on network and/or relationship properties have been described previously. For example U.S. Patent Application Publication 2007/0271272A1 teaches using connections in a personal-communications network to identify opinion leaders, where connections may be defined by the quantity of times a person's name is searched in a search engine. The method does not, however, teach segmentation of key entities using network centrality measures or the use of reach in combination with network centrality measures to systematically define adequate numbers of key entities in a subgraph of key entities or subgroups of key entities.

U.S. 2006/0184464A1 teaches finding individuals in organizations that are key individuals using profiles built from analyzing metadata including relationship data from a dataset. U.S. 2006/0184464 A1 does not teach network centrality metrics or reach or segmentation.

U.S. 2004/0073476 A1 teaches a method for obtaining a subgraph of key opinion leaders based upon an automated survey methodology. The method does not teach social network analysis for identifying key entities.

U.S. 2002/0169737 A1 discloses an Internet accessible method for displaying relationships between people, organizations, and articles. This application also teaches the concept of "reach" to assess the connectedness of an entity in a network, it does not teach network centrality metrics or segmentation of key entities by network centrality metrics or the use of reach in combination with network centrality metric values to systematically define adequate numbers of key entities in a subgraph of key entities or subgroups of key entities.

U.S. 2005/0080655 A1 teaches a method of assessing the quality of collaborative relationships, mentioning the use several different possible approaches including social network analysis (SNA). While reach and centrality metrics are mentioned as possible tools to assess quality of relationships, no systematic method for identifying key entities is presented using reach and centrality measures. The reference does not teach segmentation of key entities by network centrality metrics or the use of reach in combination with network centrality metric values to systematically define adequate numbers of key entities in a subgraph of key entities or subgroups of key entities.

SUMMARY

Disclosed herein are one or more techniques for identifying key entities in a network, building a subgraph, or invisible college, of these key entities, and segmenting the subgraph of key entities into specific sub-groups based upon their roles in the network. These techniques may be used as an alternative to the survey method for finding key opinion leaders, which avoids the disadvantages described above.

In accordance with an aspect, a method for obtaining a subgraph of key entities is provided. The method comprises determining at least two types of network centrality metrics for all entities in the giant component of the network using statistical computer programs executed by one or more processors. Rank-based scores are then assigned to each network centrality metric value of each entity. Entities are selected to form a tentative subgraph of key entities based on their network centrality metric rank-based scores using preset cut-off criteria. The reach of the entities in the tentative subgraph is calculated, and the reach is compared to a reach range. If the reach falls within the reach range, then the entities in the tentative subgraph are assigned to a subgraph of key entities. If the reach does not fall within the reach range then a portion of the above process is repeated using alternate rank-based scores cut-off criteria until a subgraph of key entities having a reach within the desired reach range is formed.

In accordance with another aspect, a method for segmenting a subgraph of key entities of a network into sub-groups based on network centrality metrics is provided. The method includes calculating at least two different network centrality metric values for each entity in the subgraph of key entities using statistical computer program executed by one or more processors. A rank-based score is assigned to each of the network centrality metric values. A plurality of rank-based score ranges are defined for each of the network centrality metrics. For each rank-based score of each entity, it is determined which of the corresponding rank-based score ranges that the rank based score falls within. Each of the subgraph of key entities is assigned to sub-groups based upon the rank-based score ranges that their rank-based scores fall within.

Other aspects, features, advantages and variations of the methods, systems, articles of manufacture and techniques disclosed herein will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

FIG. 4 is an exemplary list containing identifiers for entities in a friendship network, betweeness centrality and eigenvector centrality metric values for these entities, and rank-based scores for each of these entities.

FIG. 5 is an exemplary list identifying entities in a subgraph of key entities obtained from the friendship network along with betweeness centrality and eigenvector centrality metric values for these entities, rank-based scores for each of these entities, and a combined reach for these entities.

FIG. 6 is an exemplary list identifying entities in a subgraph of key entities obtained from the friendship network along with betweeness centrality and eigenvector centrality metric values for these entities, rank-based scores for each of these entities, and a combined reach for these entities.

FIG. 7 is an exemplary list identifying the entities in a subgraph of key entities obtained from a scientific research network.

FIG. 8 is an exemplary list identifying the key entities in a subgraph of key entities obtained from a scientific research network along with closeness centrality and eigenvector centrality metric values for these entities, and rank-based scores for each of these entities.

FIG. 9 is a figure depicting exemplary subgroups formed by segmentation of a subgraph of key entities using one set of closeness centrality and eigenvector centrality rank based score criteria.

FIG. 10 is a figure depicting exemplary subgroups formed by segmentation of a subgraph of key entities using an alternate set of closeness centrality and eigenvector centrality rank based score criteria.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

The techniques described herein are generally aimed towards the analysis of networks to identify and key entities, and to split them into key entity subgroups using social network analysis centrality measures.

Figure 1:
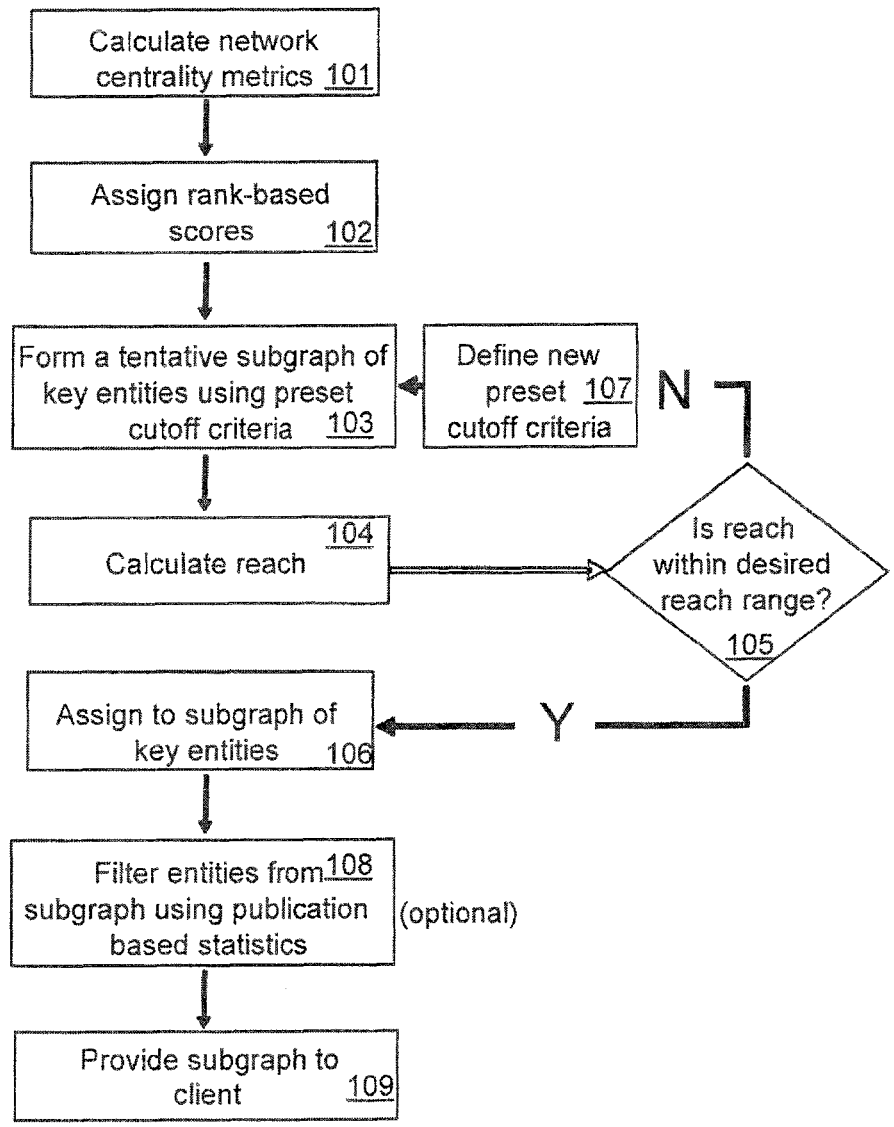
FIG. 1 is a flow diagram which depicts an exemplary method of generating a subgraph of key entities in a network.

FIG. 1 is a flow diagram which illustrates an exemplary method for obtaining a subgraph of key entities and dividing the entities into different subgroups based upon network centrality measures possessed by the entities. The method comprises, determining at least two types of network centrality metrics for all entities in the giant component of the network using statistical algorithms executed by a microprocessor or other mechanical processing device, step 101; assigning rank-based scores to each network centrality metric value of each entity, step 102; selecting entities to form a tentative subgraph of key entities based on their network centrality metric rank-based scores using preset cut-off criteria, step 103; calculating the reach of the entities, in the tentative subgraph of key entities, step 104, and comparing that reach to a desired reach range, step 105; if the reach falls within the reach range then assign the entities in the tentative subgraph of key entities to a subgraph of key entities, step 106; if the reach does not fall within the reach range then iteratively repeat the above process using alternate rank-based scores cut-off criteria, step 107, until a subgraph of key entities with a reach within the desired reach range is formed; optionally filtering entities from the subgraph of key entities using publication-based statistics, step 108; and contacting one or more of the entities in the subgraph, and/or delivering the subgraph to one or more clients, step 109.

The term "network entities" or "entities" generally refer to objects represented by a node in a network. In some instances, an entity is a person, such as a publication author, scientist, inventor political donor, philanthropist, a criminal, a physician, a nurse, a clinical worker, or an infected person.

A "subgraph" is used in this document to describe a set of entities from network of entities. Entities which are part of a subgraph and their associated data including metrics can be indicated in a list or graphically displayed as a set of nodes and links or by other means known to those of ordinary skill in the art.

The network may be a publication-based network. Publication-based networks are generally networks whose links are defined, at least in part, by publication commonalities. These may include but are not limited to co-citation, shared institution, shared journal, magazine, or newspaper, or co-authorship.

This type of information can be obtained, for instance, by searching through journal databases or the Internet and extracting that information either manually or using text mining software from electronic journals or article summaries or other methods known to those of ordinary skill in the art.

In some circumstances, the entities may be publication authors and links or connections between the entities are based upon co-authorships, co-citations, or email interactions, or other human interactions. In addition to its ordinary meaning, human interaction also refers to any social system in which organisms interact with other organisms and their collective co-existence, irrespective of whether the organisms are aware of it or not, and irrespective of whether the interaction is voluntary or involuntary. The connections may also include human-machine-human interactions, where a machine may be an intermediary step between any two humans. Links may be single links or multiple links or non-integer links. Information on email based relationships between entities can be obtained, for instance, from blogs or personal management software, surveys, or other sources known to those of ordinary skill in the art.

In other circumstances, the entity may be an institution, a topic, such as a protein, a clinic, or a patent. Information on protein networks can be obtained from scientific journals and websites, for example. Information on patents, for example relationships between inventors or assignees, can be obtained from patent databases, for example. An example of where relationships between clinics can be identified, for instance, relationships between clinics defined by joint participation in specific clinical trials, can be obtained from websites, such as www.clinicaltrials.gov.

In another example, the entities are institutions and links are based upon co-authorships, co-citations, or other cross-intuitional relationships. A good source for information on cross-institutional relationships is the Internet, including institution websites and electronic publications.

The term "reach" is generally defined as the fraction or amount of entities in a network or subcomponent of a network which are connected to another entity or a group of entities in the network. Reach can be measured in a number of ways including by first-degree links, second-degree links, or higher order links. First-degree or second-degree links refer to the shortest link path distance between any two nodes. Nodes with a shortest link path of two are two links apart have a second-degree link. Stated differently, the two nodes are separated by another node. Nodes with a shortest link path distance of one are directly connected through a single link, and are considered to be adjacent to each other, i.e., these adjacent nodes are connected by a first-degree link.

In one example, the reach is the fraction of entities in the giant component which are connected to the entities in the tentative subgraph by first-degree links, second-degree links or a combination thereof.

In another example, the reach is the fraction of entities in the giant component which are connected to the entities in the tentative subgraph of key entities by first-degree links.

The term "network centrality metrics" includes measures of centrality used in graph theory and network analysis. These measures indicate the importance of a node in a graph. In graphs where nodes correspond to entities and graphs correspond to collections of entities and their connections, these measures indicate the importance of an entity in a collection of entities. Some exemplary network centrality metrics include degree centrality, betweeness centrality, eigenvector centrality, Bonacich's power centrality, and closeness centrality. Computer programs, such as statistics and/or social networking software, e.g., UCINET or SAS, can be used to calculate these metrics from network adjacency matrices constructed for the networks. A person may also write their own code using, for instance, Java, FORTRAN, or C++.

The networks on which the centrality metric computer programs are generally applied are large and consist of many nodes and links. Therefore, execution of these programs, on a reasonable timescale, may be performed by computers. The use of a computer involves the translation of social network analysis algorithms into specific computer program code, which may be reasonably accomplished by those of ordinary skill in the art.

The term "giant component" generally refers to the largest group of connected nodes in a graph. It should be understood, however, that there may be multiple sub-graphs in a network and the "giant component" may refer to some or all of these.

The reach of the tentative subgraph of the key entities may be calculated following its establishment. If the reach falls below or above a particular reach range, then cutoff-values can be changed to alter the number of the rank-based scores which are acceptable to permit inclusion of an entity into the tentative subgraph of key entities.

The term "publication-based statistics" generally refers to statistics or variables related to extent of publication, for example publication count, but may also refer to geography of publication, impact factor, or other variables associated with publications, or that can be embedded in or extracted from one or more publications.

Figure 2:
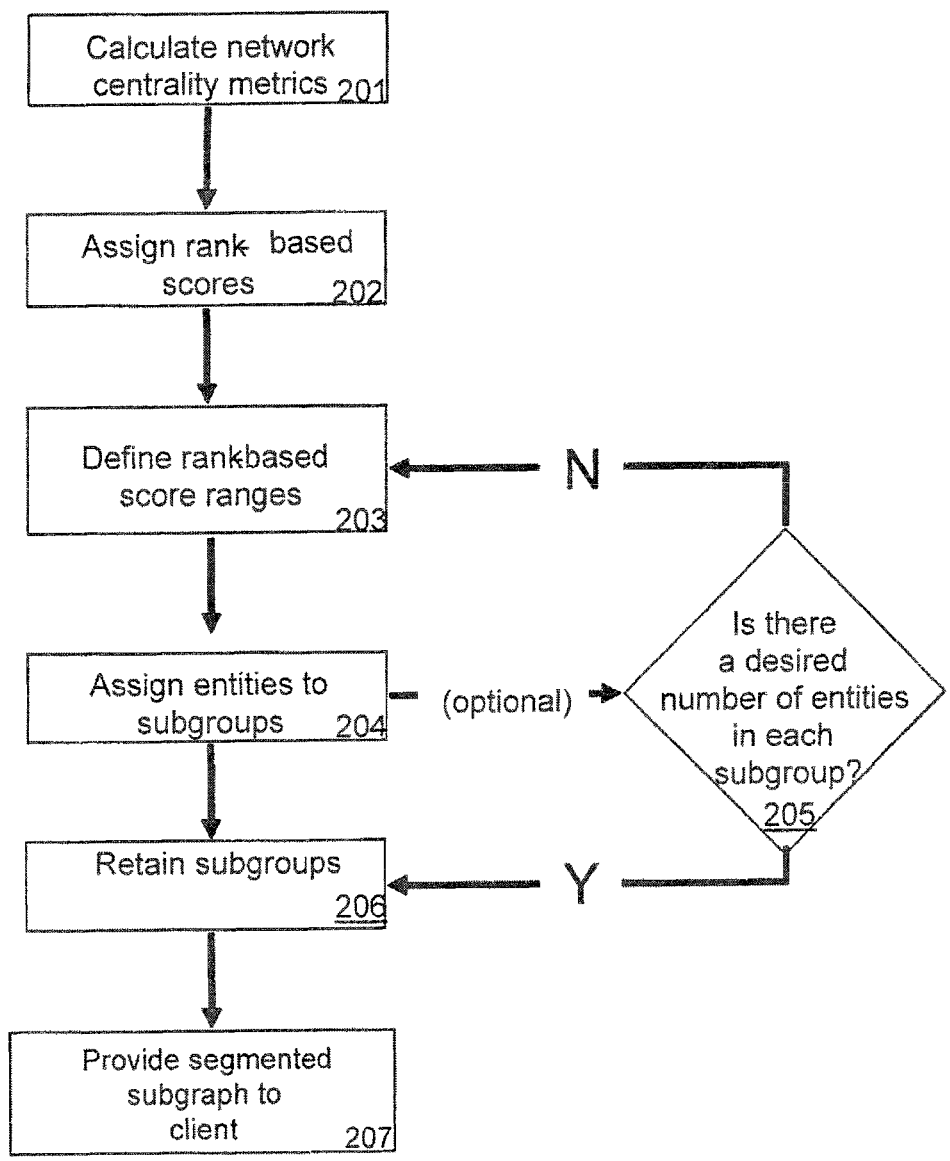
FIG. 2 is a flow diagram which depicts an exemplary method of segmenting a subgraph of key entities of a network into sub-groups based on network centrality metrics.

FIG. 2 is a flow diagram which illustrates an exemplary method of segmenting a subgraph of key entities of a network into sub-groups based on network centrality metrics 200.

The method includes calculating at least two different network centrality metric values, step 201, for each entity in the subgraph of key entities using statistical algorithms executed by a microprocessor or other mechanical processing device; assigning a rank-based score to each of the network centrality metric values, step 202; defining two or more rank-based score ranges for each of the network centrality metrics, step 203; for each rank-based score of each entity determining which of the corresponding rank-based score ranges that the rank-based score falls within; assigning each of the subgraph of key entities entities to sub-groups based upon the rank-based score ranges that their rank-based scores fall within, step 204; and optionally, step 205, repeating the above steps using alternative rank-based score ranges until a desired number of entities is assigned to each sub-group, step 206; and contacting one or more of the entities in one or more of the segmented subgraphs, and/or delivering the segmented subgraph to one or more clients.

In at least one embodiment of the invention at least three different types of network centrality metrics or, at least two different types of network centrality metrics and at least one publication related variable are used to segment a subgraph of key entities.

The term "segmenting" refers to dividing entities into subgroups. The entities in particular subgroups share similarities in their network centrality metric values or publication related statistics. For instance, entities with high betweeness centrality scores and low eigenvector centrality scores may be segmented together into a subgroup. In general, the subgroup in which a particular entity is segmented into will indicate something about the role of that entity in the network. The network may be a publication-based network.

EXAMPLE 1

Figure 3:
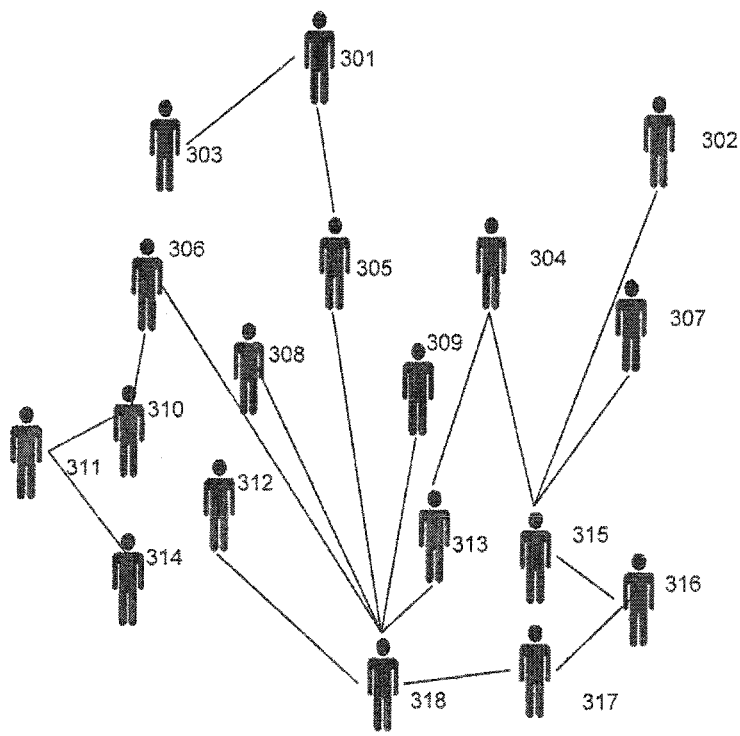
FIG. 3 is a representation of a network of individuals where nodes represent individual persons and links between nodes represent friendships between the nodes.

FIG. 3, depicts a small network 300 of persons who have relationships with one another defined, by survey acknowledged friendship. In this example, we seek to identify a few key persons in the network to communicate information to in order to efficiently spread that information over most of the network. Icons 301-318 represent eighteen persons in the network. Friendship is represented by links connecting the eighteen individuals. In this example the links are not weighted, although the may be weighted in other circumstances.

The betweeness centrality and eigenvector centrality may be determine for this network and betweeness centrality and associated with each network entity. These values are listed in FIG. 4, along with their associated rank-based scores. Prior to the calculations, cut-off criteria are set, e.g., it was determined that only persons in the friendship network possessing top 15% betweeness centrality scores or top 15% eigenvector centrality scores would be contacted with the information desired to be communicated across the network. Individuals with high betweeness scores should be able to pass the information between the various disconnected subgroups of friends in the network. Individuals in the high eigenvector scores should be able to pass the information to a large number of other individuals in the network as these individual's possess friendships to popular individuals in the network.

As 15% of eighteen is about three, the three individuals within the network possessing top 15% betweeness centrality scores (e.g., icons 118, 115, and 113) were selected; and the three individuals within the network possessing the top 15% eigenvector centrality scores (icons 118, 113, and 117) were selected. Obviously, there is overlap between the selected groups of entities. When merged to form a tentative subgraph of key entities there are four unique entities (icons 118, 117, 113, and 115). The reach of these entities in the friendship network was then calculated using first-degree links and found to be 72%. That is these four individuals, possessed first-degree connections to 72% of the network. These data are displayed in a list in FIG. 5.

In some situations, it may be desirable to communicate the piece of information to a higher percentage of individuals in the friendship network a larger reach than 72%. In order to achieve a higher reach it was deemed necessary to alter the permissible rank based betweeness centrality and eigenvector centrality score ranges to top 22% rather than top 15%. The expanded ranges allow for the inclusion of two additional entities (icons 105 and 106) into the tentative subgraph of key entities. This subgraph now includes a total of six entities (icons 118, 117, 113, 115, 105, and 106). These entities have combined reach of 83%. These data are displayed in a list in FIG. 6. It was determined that this was an acceptable reach and the tentative subgraph of key entities can now be considered a subgraph of key entities. The subgraph of key entities was then delivered to the client as an email attachment.

EXAMPLE 2

The second example illustrates segmentation of a subgraph of key entities using network centrality measures. In this example, a subgraph of twenty-three key entities in a scientific research network is present. The subgraph entities are displayed in a list in FIG. 7. It should be noted that the subgraph of key entities 700 in this example may or may not have been constructed using network centrality measures. In this example, the client's interest is in marketing an expensive computer program to persons in the subgraph of key entities. Note also that the entities' names, profiles, and other descriptors have been replaced by numeric identifiers, 701-723. In this case, the client would like to place more resources into marketing the product to influential people in the subgraph of key entities with the hope that if they purchase the program, other entities in the scientific research network will be in swayed into also purchasing the program.

The entities in the subgraph of key entities are segmented into four different subgroups.

Subgroup A includes individuals who are close to the center of the network and possess connections to well-connected entities in the network. These individuals, in general, have high values of eigenvector centrality and closeness centrality, and would likely possess the funding necessary to purchase the program and the influence necessary to sway others in the network to purchase the program.

Subgroup B includes individuals who are well connected to well-connected individuals in the network but are not working in the core of the network. These individuals should have high eigenvector centrality values and low closeness centrality values. It can be hypothesized that these individuals may be very influential in a small subset of the research network but are not very influential to the network on a whole because they may be working on an unpopular research topic. It may also be hypothesized that these individuals may or may not have the funding available to purchase the program.

Subgroup C includes individuals in the subgraph of key entities who are in the core of the network, perhaps because they work on a very popular research topic, but are not well connected to well-connected people in the network. These individuals should have high values of closeness centrality but not eigenvector centrality. It may be hypothesized that individuals in this subgroup may have a moderate degree of influence on other researchers in the network because they may be working on a very popular research topic and may be publishing in popular journals, but may or may not have enough funding available to purchase the computer program.

Subgroup D includes individuals who are not that well connected to well-connected individuals in the network and who are not at the core of the network. These individuals may not have funding to purchase the computer software we are marketing. It is also unlikely that these individuals will be able to influence other members of the network to purchase the software.

From an adjacency matrix containing relationship data for the entire network, eigenvector and closeness centrality metric values are calculated. The values are then ranked for individuals in the subgraph of key entities. The network centrality values and rank scores are appended to the subgraph of key entities and that table is shown in FIG. 8.

In this example, individuals segmented into Subgroup A have an eigenvector centrality rank that is between 1 and 5 and a closeness centrality rank that is between 1 and 10. Individuals segmented into Subgroup B are individuals not segmented into Subgroup A who have an eigenvector centrality rank score between 1 and 5. Individuals segmented into Subgroup C are individuals not segmented into Subgroup A who have a closeness centrality rank score of between 1 and 10. Subgroup D then contains all of the other entities in the key subgraph of entities.

As a result of these rank score criteria, the twenty-three entities are segmented to the four subgroups as indicated in FIG. 9. There are five entities in Subgroup A, no entities in Subgroup B, five entities in Subgroup C, and thirteen entities in Subgroup D.

To allow for more entities to be included into Subgroup B, the rank-based score ranges are then redefined.

The new ranges are as follows: Subgroup A has an eigenvector centrality rank that is between 1 and 5 and a closeness centrality rank that is between 1 and 5. Individuals segmented into Subgroup B are individuals not segmented into Subgroup A who have an eigenvector centrality rank score between 1 and 10 and whose eigenvector centrality rank score is greater than or equal to their closeness centrality rank score. Individuals segmented into Subgroup C are individuals not segmented into Subgroup A or Subgroup B who have a closeness centrality rank score of between 1 and 10. Subgroup D, as in the previous scheme, contains all of the other entities in the subgraph of key entities.

With these revised rank score criteria, the twenty-three entities were again segmented into the four subgroups as indicated in FIG. 10. There are four entities in Subgroup A, four entities in Subgroup B, two entities in Subgroup C, and thirteen entities in Subgroup D. It was decided that this segmentation gave an adequate number of entities in each subgroup and the subgroups should be retained. Several entities in the segmented subgraph were then contacted, by phone to deliver a marketing message to them.

Figure 11:
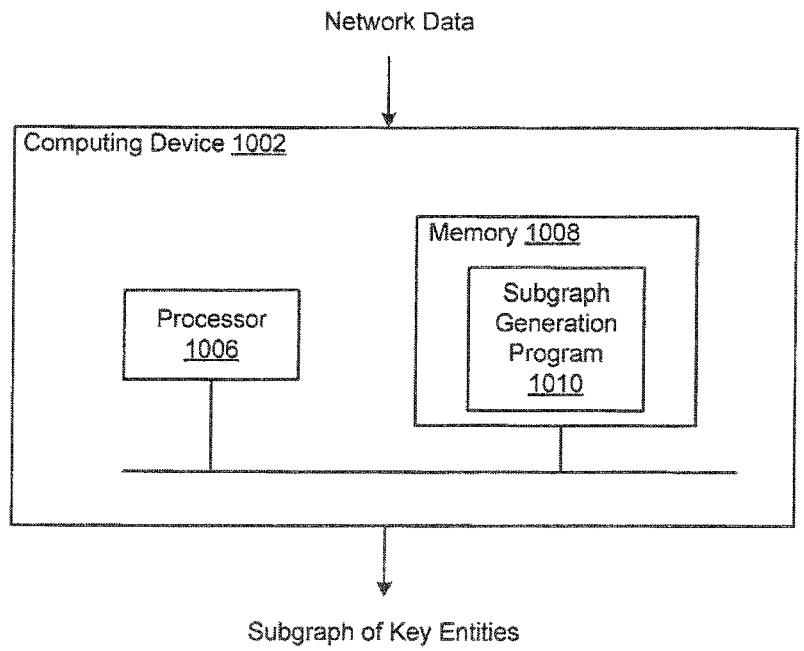
FIG. 11 is a conceptual block diagram illustrating certain components of an exemplary system for generating a subgraph of key entities in a network.

FIG. 11 is a conceptual block diagram illustrating certain components of an exemplary system for generating a subgraph of key entities in a network. The system includes a computing device 1002 having a processor 1006 and a memory 1008 in communication with one another. Among other things, the memory stores a subgraph generation computer program 1010. The memory 1008 may also store other programs and/or data. The processor 1006 includes one or more digital circuits, such as microprocessors, DSPs, embedded controllers, or intellectual property (IP) cores for executing programs stored in the memory 1008. The memory 1008 may be any suitable computer storage medium capable of storing instructions and/or data.

The computing device 1002 receives data about the network and entities within the network, and in turn, the subgraph generation program 1010 produces a subgraph of key entities by executing some or all of the method steps described above in connection with FIG. 1. More specifically, the subgraph generation program 1010 includes instructions executable by the processor 1006 for causing the computing device 1002 to perform some or all of the steps described above in connection with FIG. 1.

Figure 12:
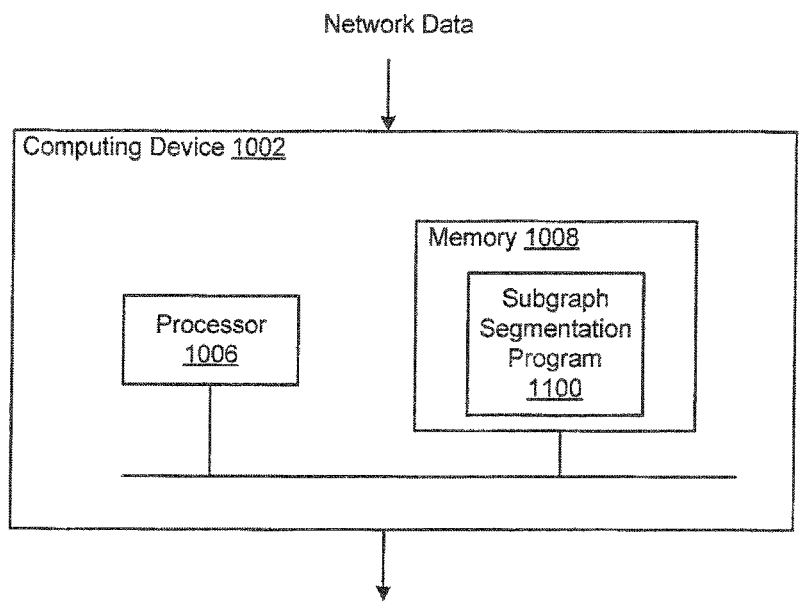
FIG. 12 is a conceptual block diagram illustrating certain components of an exemplary system for segmenting a subgraph of key entities of a network into subgroups based on network centrality metrics.

FIG. 12 is a conceptual block diagram illustrating certain components of an exemplary system for segmenting a subgraph of key entities of a network into sub-groups based on network centrality metrics. The system includes the computing device 1002 having the processor 1006 and the memory 1008 in communication with one another. Among other things, the memory 1008 stores a subgraph segmentation computer program 1100.

The computing device 1002 receives data about the network, including data about entities within the network, and in turn, the subgraph segmentation program 1100 produces one or more subgraph segments by executing some or all of the method steps described above in connection with FIG. 2. More specifically, the subgraph segmentation program 1100 includes instructions executable by the processor 1006 for causing the computing device 1002 to perform some or all of the steps described above in connection with FIG. 2.

It is noted that the computing device 1002 may be configured to store both the subgraph generation and subgraph segmentation programs 1010, 1100 in memory 1008, and that the functions of each program 1010, 1100 may be combined into a single program, or that the programs 1010, 1100 may be executed together in a cooperative manner.

The functionality of the systems, devices, and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Other embodiments and modifications of the methods, systems and articles of manufacture described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. In a non-transitory computer-readable medium, a method of generating a subgraph of key entities in a network, and segmenting the subgraph of key entities of a network into sub-groups based on network centrality metrics, the method comprising:
    a. generating the subgraph of key entities, comprising:
        i. determining, by executing at least one computer program on one or more processors, at least two independent types of network centrality metrics for a plurality of entities in a giant component of the network; wherein the network is a publication-based network; wherein the entities are publication authors or institutions, and links between the entities in the network are based upon co-authorships, co-citations, cross-institutional relationships, or a combination thereof, from publication data;
        ii. selecting starting cut-off criteria for each network centrality metric;
        iii. assigning a plurality of rank-based scores to each entity, where each rank-based score corresponds to each network centrality metric value of each entity;
        iv. selecting some of the entities to form a tentative subgraph of key entities, wherein a sub graph of key entities is defined as a social network graph of a group of entities within the giant component of the network, where the selection of key entities is based on comparisons of the plurality of rank-based scores to the plurality of cut-off criteria, the selection process comprising:
            1. identifying the entities whose score for a network centrality metric exceeds the cutoff criteria;
            2. merging the identified entities into the tentative sub graph; and
            3. iteratively repeating steps 1 and 2 of the selection process for each network centrality metric
        v. calculating a reach of the entities in the tentative sub graph of key entities and comparing the reach to a reach range, wherein the reach is defined as a fraction of entities in the giant component which are connected to the entities in the tentative sub graph by first-degree links, second-degree links or a combination thereof; wherein the first-degree and second-degree links are based upon co-authorships, co-citations, cross-institutional relationships, or a combination thereof, and where the reach range is defined by a minimum and a maximum reach threshold;
        vi. If the reach falls within the reach range, defined as falling above the minimum reach threshold and below the maximum reach threshold, assigning the entities in the tentative sub graph of key entities to the subgraph of key entities, wherein the subgraph of key entities represents a core group of key opinion leaders within a social network;
        vii. if the reach does not fall within the reach range, independently adjusting one or more of the cut-off criteria for each network centrality metric; and
        viii. iteratively repeating steps iii-vii of the generating the subgraph of key entities until the subgraph of key entities with a reach within the reach range is formed, and
    b. segmenting the subgraph into subgroups, comprising:
        i. calculating, by executing at least one computer program on one or more processors, at least two independent network centrality metric values for each entity in the sub graph of key entities; wherein the network centrality metrics quantitatively indicate independent characteristics of an entity in the network;
        ii. assigning a plurality of rank-based scores to each entity, where each rank-based score corresponds to each network centrality metric value of each entity;
        iii. defining a plurality of rank-based score ranges for each of the network centrality metrics,
        iv. defining a plurality of subgroups corresponding to combinations of the rank based score ranges; and
        v. assigning each entity of the sub graph of key entities to one or more subgroups, comprising:
            1. for each rank based score range, determining the score range that the entity's rank-based scores falls into;
            2. for each subgroup, determining if the entity's rank-based scores fall within the score ranges corresponding to the subgroup; and
            3. assigning the entity to the corresponding subgroup;
            4. if the entity falls within more than one subgroup, removing the entity from one or more of the subgroups;
        vi. repeating steps iii-v of the segmenting the subgraph into subgroups until a predetermined number of entities is assigned to each subgroup.

2. The method of claim 1, further comprising filtering entities from the subgraph of key entities based on publication-based statistics.

3. The method of claim 1, further comprising contacting one or more of the entities in the subgraph of key entities, or segmented subgroup, and delivering the subgraph to one or more clients.

4. The method of claim 1, wherein at least three different types of network centrality metrics, or at least two different types of network centrality metrics and at least one publication related variable, are used to segment a subgraph of key entities.

5. A non-transitory computer-readable medium, excluding signals, embodying a set of instructions executable by one or more processors, comprising:
    a. code for identifying a subgraph of key entities, comprising:

i. code for computing at least two independent types of network centrality metrics for a plurality of entities in a giant component of a network; wherein the network centrality metrics quantitatively indicate independent characteristics of an entity in the network, wherein the network is a publication-based network; wherein the entities are publication authors or institutions, and links between the entities in the network are based upon co-authorships, co-citations, cross-institutional relationships, or a combination thereof, from publication data;

ii. code for selecting starting cut-off criteria for each network centrality metric;

iii. code for assigning a plurality of rank-based scores to each entity, where each rank-based score corresponds to each network centrality metric value of each entity;

iv. code for selecting some of the entities to form a tentative subgraph of key entities, wherein a sub graph of key entities is defined as a social network graph of a group of entities within the giant component of the network, where the selection of key entities is based on comparisons of the plurality of rank-based scores to the starting cut-off criteria, the selection process comprising:

1. code for identifying the entities whose network centrality metric score for a network centrality metric exceeds the starting cut-off criteria;
2. code for merging the identified entities into the tentative subgraph of key entities;
3. code for iteratively repeating steps 1 and 2 of the code for selecting some of the entities to form a tentative subgraph of key entities for each network centrality metric;

v. code for calculating a reach of the entities in the tentative subgraph of key entities and comparing the reach to a reach range, wherein the reach is defined as a fraction of entities in the giant component of the network which are connected to the entities in the tentative subgraph by first-degree links, second-degree links or a combination thereof; wherein the first-degree and second-degree links are based upon co-authorships, co-citations, cross-institutional relationships, or a combination thereof, and where the reach range is defined by a minimum and a maximum reach threshold;

vi. code for determining if the reach falls within the reach range, defined as falling above the minimum reach threshold and below the maximum reach threshold, assigning the entities in the tentative subgraph of key entities to the subgraph of key entities, wherein the subgraph represents a core group of key opinion leaders within a social network;

vii. code for determining if the reach does not fall within the reach range, and if so, independently adjusting one or more of the starting cut-off criteria for each network centrality metric; and viii. code for iteratively repeating steps iii-vii of the code for identifying a sub-graph until a subgraph of key entities with a reach within the reach range is formed;

b. code for segmenting the subgraph into subgroups, comprising:

i. code for executing at least one statistical computer program on one or more processors to calculate at least two independent network centrality metric values for each entity in the subgraph of key entities;

ii. code for assigning a plurality of rank-based scores to each entity, where each rank-based score corresponds to each network centrality metric value of each entity;

iii. code for defining a plurality of rank-based score ranges for each of the network centrality metrics, thus dividing a space spanned by the plurality of network centrality metrics into segments, where each subgroup corresponds to a segment of the space;

iv. code for assigning each entity of a subgraph of key entities to one or more subgroups, wherein a subgraph of key entities is defined as a social network graph of the minimum group of entities within the giant component of the network whose first-degree or second-degree relationships reach a desired minimum percentage of the entities in the giant component of the network, comprising:

1. code for determining the score range that the entity's rank-based score falls into, for each rank-based score;
2. code for determining the segment of the centrality metric space that the entity's scores fall within, using the plurality of score ranges that the entity's scores fall within;
3. code for assigning the entity to the subgroup corresponding to the segment of the space;
4. if the entity falls within more than one subgroup, code for removing the entity from one or more of the subgroups; and v. code for repeating steps ii-iv of the code for segmenting the subgraph into subgroups until a predetermined number of entities is assigned to each subgroup.

6. A system, comprising:

a. means for identifying a subgraph of key entities within a larger social network, comprising:

i. means for computing at least two independent types of network centrality metrics for a plurality of entities in a giant component of a network; wherein the network centrality metrics quantitatively indicate independent characteristics of an entity in the network, wherein the network is a publication-based network; wherein the entities are publication authors or institutions, and links between the entities in the network are based upon co-authorships, co-citations, cross-institutional relationships, or a combination thereof, from publication data;

ii. means for selecting starting cut-off criteria for each network centrality metric;

iii. means for assigning a plurality of rank-based scores to each entity, where each rank-based score corresponds to each network centrality metric value of each entity;

iv. means for selecting some of the entities to form a tentative subgraph of key entities, wherein a subgraph of key entities is defined as a social network graph of a group of entities within the giant component of the network, where the selection of key entities is based on comparisons of the plurality of rank-based scores to the plurality of starting cut-off criteria, the selection process comprising:

1. means for identifying the entities whose network centrality metric score for a network centrality metric exceeds the starting cut-off criteria;
2. means for merging these entities into the tentative subgraph of key entities;
3. means for iteratively repeating steps (1) to (2) 1 and 2 of the selection process for each network centrality metric v. means for calculating a reach of the entities in the tentative subgraph of key entities and comparing the reach to a reach range, wherein the reach is defined as a fraction of entities in the giant component which are connected to the entities in the tentative subgraph by first-degree links, second-degree links or a combination thereof; wherein the first-degree and second-degree links are based upon co-authorships, co-citations, cross-institutional relationships, or a combination thereof, and where the reach range is defined by a minimum and a maximum reach threshold;

vi. means for determining if the reach falls within the reach range, defined as falling above the minimum reach threshold and below the maximum reach threshold, assigning the entities in the tentative subgraph of key entities to the subgraph of key entities, wherein the subgraph represents a core group of key opinion leaders within a social network;

vii. means for determining if the reach does not fall within the reach range, and if so, independently adjusting one or more of the starting cut-off criteria for each network centrality metric; and viii. means for iteratively repeating steps iii-vii of identifying a subgraph of key entities until a subgraph of key entities with a reach within the reach range is formed.

b. means for segmenting the subgraph into subgroups, comprising:

i. means for executing at least one statistical computer program on one or more processors to calculate at least two independent network centrality metric values for each entity in the subgraph of key entities;

ii. means for assigning a plurality of rank-based scores to each entity, where each rank-based score corresponds to each network centrality metric value of each entity;

iii. means for defining a plurality of rank-based score ranges for each of the network centrality metrics, thus dividing a space spanned by the plurality of network centrality metrics into segments, where each subgroup corresponds to a segment of the space;

iv. means for assigning each entity of the sub graph of key entities to one or more subgroups, wherein a sub graph of key entities is defined as a social network graph of the minimum group of entities within the giant component of the network whose first-degree or second-degree relationships reach a desired minimum percentage of the entities in the giant component of the network, comprising:

1. means for determining the rank-based score range that the entity's score falls into, for each rank-based score;
2. means for determining the segment of the centrality metric space that the entity's scores fall within, using the plurality of rank-based score ranges that the entities scores fall within;
3. means for assigning the entity to the subgroup corresponding to the segment of the space determined in step 2;
4. means for removing, if the entity falls within more than one subgroup, the entity from one or more of the subgroups; and v. means for repeating steps iii-iv of assigning each entity of the subgraph of key entities to one or more subgroups until a predetermined number of entities is assigned to each subgroup.

\* \* \* \* \*